United States Patent
Patki et al.

(10) Patent No.: US 11,265,257 B2
(45) Date of Patent: Mar. 1, 2022

(54) RAPID NETWORK TRAFFIC TELEMETRY EXPORTS WITH SPLIT TEMPLATES AND FLOW RECORDS

(71) Applicant: Cisco Technology, Inc., San Jose, CA (US)

(72) Inventors: Dhananjay Shrikrishna Patki, Karnataka (IN); Ralu Johny, Banagalore (IN); Alexander M. Thuijs, Holliston, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/868,959

(22) Filed: May 7, 2020

(65) Prior Publication Data
US 2021/0328940 A1    Oct. 21, 2021

(30) Foreign Application Priority Data
Apr. 16, 2020   (IN) .............. 202041016545

(51) Int. Cl.
*H04L 12/891* (2013.01)
*H04L 47/41* (2022.01)
*H04L 45/50* (2022.01)
*H04L 61/5007* (2022.01)
*H04L 47/2483* (2022.01)

(52) U.S. Cl.
CPC .............. *H04L 47/41* (2013.01); *H04L 45/50* (2013.01); *H04L 47/2483* (2013.01); *H04L 61/2007* (2013.01)

(58) Field of Classification Search
CPC ..... H04L 47/41; H04L 45/50; H04L 47/2483; H04L 61/2007
See application file for complete search history.

(56) References Cited

U.S. PATENT DOCUMENTS

| | | |
|---|---|---|
| 8,125,920 B2 | 2/2012 | Aitken et al. |
| 9,432,269 B2 | 8/2016 | Annamalaisami et al. |
| 9,438,488 B2 | 9/2016 | Joshi et al. |
| 9,729,432 B2 | 8/2017 | Shearman et al. |
| 9,967,178 B1 * | 5/2018 | K S .................. H04L 45/38 |
| 10,003,531 B2 | 6/2018 | Zhou |
| 10,057,344 B2 | 8/2018 | Clemm et al. |
| 10,193,801 B2 | 1/2019 | Minei et al. |
| 10,250,552 B1 | 4/2019 | Sajassi |
| 10,469,372 B2 | 11/2019 | Filsfils et al. |

(Continued)

OTHER PUBLICATIONS

Cisco, "Cisco IOS NetFlow Version 9 Flow-Record Format", Cisco White Paper, May 2011, 14 pages.

(Continued)

*Primary Examiner* — Chi H Pham
*Assistant Examiner* — Weibin Huang
(74) *Attorney, Agent, or Firm* — Edell, Shapiro & Finnan, LLC

(57) ABSTRACT

A solution that provides for increased high-frequency, record exports giving real-time insight of traffic patterns, by splitting a conventional monolithic template into a static template and a dynamic template. Static flow records are sent only at the beginning of a flow, or when 'almost static' information elements change. Dynamic records are sent very frequently, and only when there is a dynamic information element change.

20 Claims, 10 Drawing Sheets

(56) References Cited

U.S. PATENT DOCUMENTS

| | | | | |
|---|---|---|---|---|
| 10,616,101 | B1* | 4/2020 | Peterson | H04L 47/12 |
| 2016/0366035 | A1* | 12/2016 | Ortega | H04L 43/04 |
| 2017/0316358 | A1* | 11/2017 | Candito | G06Q 10/0639 |
| 2019/0158591 | A1 | 5/2019 | Kjendal et al. | |
| 2019/0373052 | A1* | 12/2019 | Pollitt | H04L 43/026 |
| 2020/0186557 | A1* | 6/2020 | Ishikawa | G06F 17/18 |
| 2021/0029050 | A1* | 1/2021 | Jain | H04L 43/026 |
| 2021/0083941 | A1* | 3/2021 | Mutnuru | H04L 41/0896 |

OTHER PUBLICATIONS

IANA, "IP Flow Information Export (IPFIX) Entities", IANA, Jul. 25, 2019, 24 pages; retrieved from Internet Mar. 30, 2020, https://www.iana.org/assignments/ipfix/ipfix.xhtml.

B. Claise, Ed. et al., "Information Model for IP Flow Information Export (IPFIX)", Internet Engineering Task Force (IETF), RFC 7012, Sep. 2013, 24 pages.

B. Claise, Ed. et al., "Packet Sampling (PSAMP) Protocol Specifications", Network Working Group, RFC 5476, Mar. 2009, 45 pages.

B. Claise, Ed. et al., "Specification of the IP Flow Information Export (IPFIX) Protocol for the Exchange of Flow Information", Internet Engineering Task Force (IETF), RFC 7011, Sep. 2013, 76 pages.

Cisco, "Cisco IOS Flexible NetFlow", Cisco, Dec. 2008, 5 pages.

Cisco, "Cisco IOS Flexible NetFlow Technology", Cisco, Dec. 2008, 5 pages.

\* cited by examiner

| Header | | |
|---|---|---|
| | Length | |
| | | Field Count |
| FlowSet ID (0) | | |
| Template ID (256) | | |
| IN_PKTS | | 4 |
| IN_BYTES | | 4 |
| IPV4SRCADDR | | 4 |
| IPV4DSTADDR | | 4 |
| INPUT_SNMP | | 4 |
| OUTPUT_SNMP | | 4 |
| LAST_SWITCHED | | 4 |
| FIRST_SWITCHED | | 4 |
| SRC_PORT | | 2 |
| DST_PORT | | 2 |
| SRC_AS | | 4 |
| DST_AS | | 4 |
| BGP_IPV4_NEXT_HOP | | 4 |
| SRC_MASK | | 1 |
| DST_MASK | | 1 |
| PROT | | 1 |
| TCP_FLAGS | | 1 |
| TOS | | 1 |
| DIRECTION | | 1 |
| FORWARDING_STATUS | | 1 |
| FLOW_SAMPLER_ID | | 2 |
| VRF_ID_INPUT | | 4 |
| VRF_ID_OUTPUT | | 4 |
| AS_PATH | | 128 |
| STD_COMM | | 128 |

FIG. 2

Static IE template

| Header | | |
|---|---|---|
| | Length | |
| | Field Count | |
| FlowSet ID (0) | | |
| Template ID1 | | |
| IPV4SRCADDR | | 4 |
| IPV4DSTADDR | | 4 |
| INPUT_SNMP | | 4 |
| OUTPUT_SNMP | | 4 |
| FIRST_SWITCHED | | 4 |
| SRC_PORT | | 2 |
| DST_PORT | | 2 |
| SRC_AS | | 4 |
| DST_AS | | 4 |
| BGP_IPV4_NEXT_HOP | | 4 |
| SRC_MASK | | 1 |
| DST_MASK | | 1 |
| PROT | | 1 |
| TCP_FLAGS | | 1 |
| TOS | | 1 |
| DIRECTION | | 1 |
| FLOW_SAMPLER_ID | | 2 |
| VRF_ID_INPUT | | 4 |
| VRF_ID_OUTPUT | | 4 |
| AS_PATH | | 128 |
| STD_COMM | | 128 |
| FLOW_ID | | 8 |

FIG. 3A

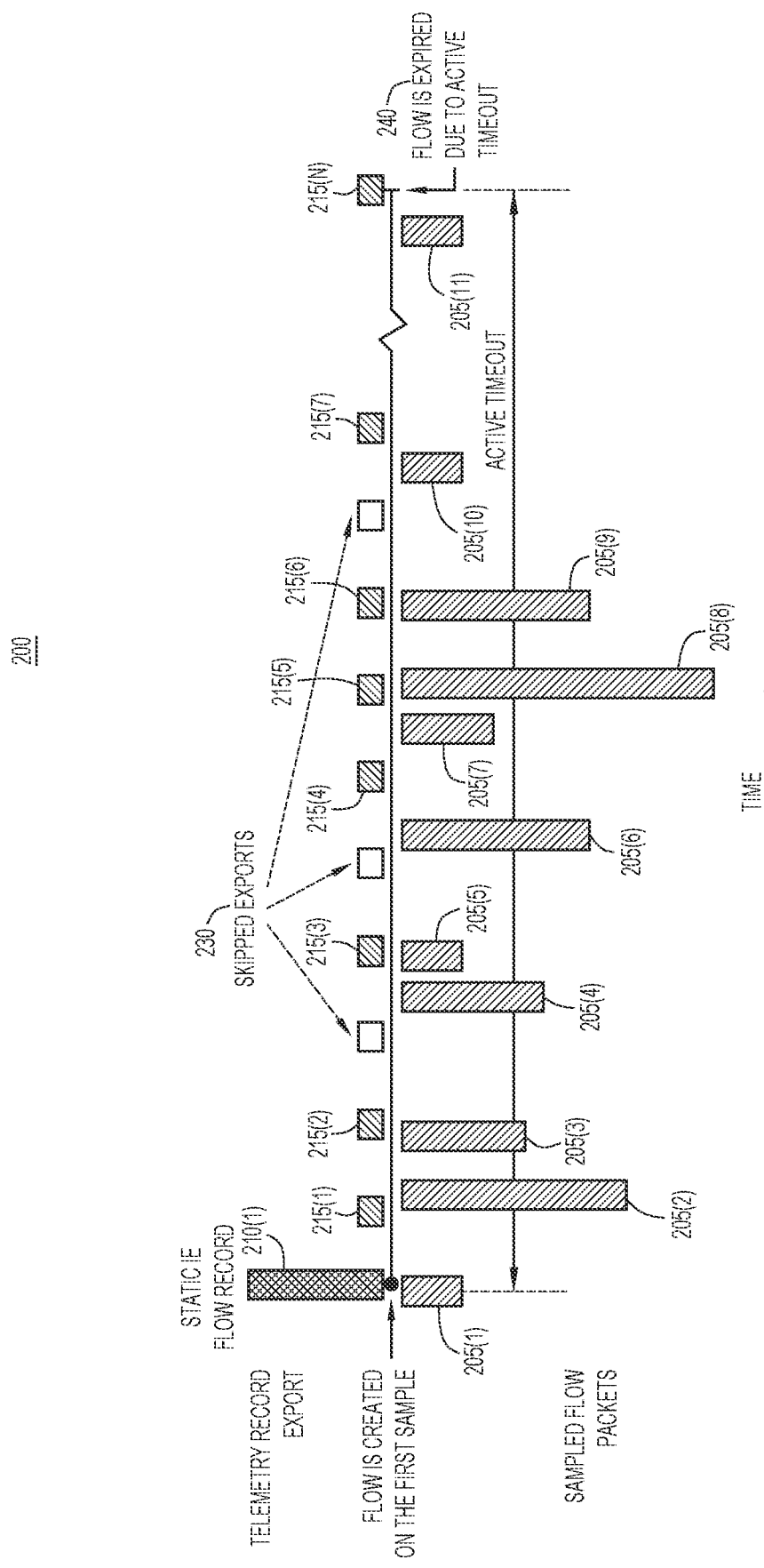

RAPID NETWORK TRAFFIC TELEMETRY EXPORTS WITH SPLIT TEMPLATES AND FLOW RECORDS

PRIORITY CLAIM

This application claims priority to Indian Provisional Application No. 202041016545, filed Apr. 16, 2020, the entirety of which is incorporated herein by reference.

TECHNICAL FIELD

The present disclosure relates to computer networking.

BACKGROUND

Network traffic telemetry technologies, such as NetFlow and Internet Protocol Flow Information Export (IPFIX), collect and aggregate information about network traffic flowing through a device and output flow records that are sent to a centralized flow collector in their respective message formats. NetFlow and IPFIX data records follow templates in terms of structure and specification of contents. Flow information is used by an analytics engine that reads the exported data from the collector for offline processing.

BRIEF DESCRIPTION OF THE DRAWINGS

FIG. 2 is a diagram of a monolithic telemetry template according to existing techniques.

FIGS. 3A and 3B illustrate examples of a static template and a dynamic template, respectively, for generating static flow records and dynamic flow records, according to an example embodiment.

FIGS. 4A and 4B illustrate network telemetry record export operations using a static template and a dynamic template, according to an example embodiment.

DESCRIPTION OF EXAMPLE EMBODIMENTS

Overview

Presented herein is a solution that makes rapid periodic exports of network traffic flow telemetry possible by splitting a conventional monolithic template into at least a static template and a dynamic template, use for generation static flow records and dynamic flow records, respectively. A network device stores data describing a first template and a second template. The first template is configured to produce static flow records comprising information elements which are based on static or relatively static characteristics of a given traffic flow processed by the network device. The second template configured to produce dynamic flow records comprising information elements which are based on dynamic characteristics of the given traffic flow. The network device generates the static flow records using the first template and the dynamic flow records using the second template for the given traffic flow processed by the network device. The network device exports the static flow records and the dynamic flow records from the network device.

Example Embodiments

Rapid periodic export of flow information for all network flows is quite useful for real-time analysis of network traffic flow telemetry information in order to make quick and accurate decisions to react to changes in a network. By "rapid periodic" export it is meant that, for example, that an export is performed every 1 or 2 seconds, but may include exports as frequent as at least every 30 seconds.

Network equipment vendors typically define monolithic network traffic flow telemetry templates for exporting telemetry data for various types of flows, such as Internet Protocol version 4 (IPv4), Internet Protocol version 6 (IPv6), Multi-Protocol Label Switching (MPLS), etc. These templates include all information related to the flows, including source and destination of the flow, various fields in the corresponding protocol headers and counters. While the information in the templates is elaborate enough to characterize the flows, it makes the exported data records quite bulky and unsuitable for rapid periodic exports as such exports put a lot of pressure on export processing on the network device, often causing the exported packets to be dropped.

Figure 1:
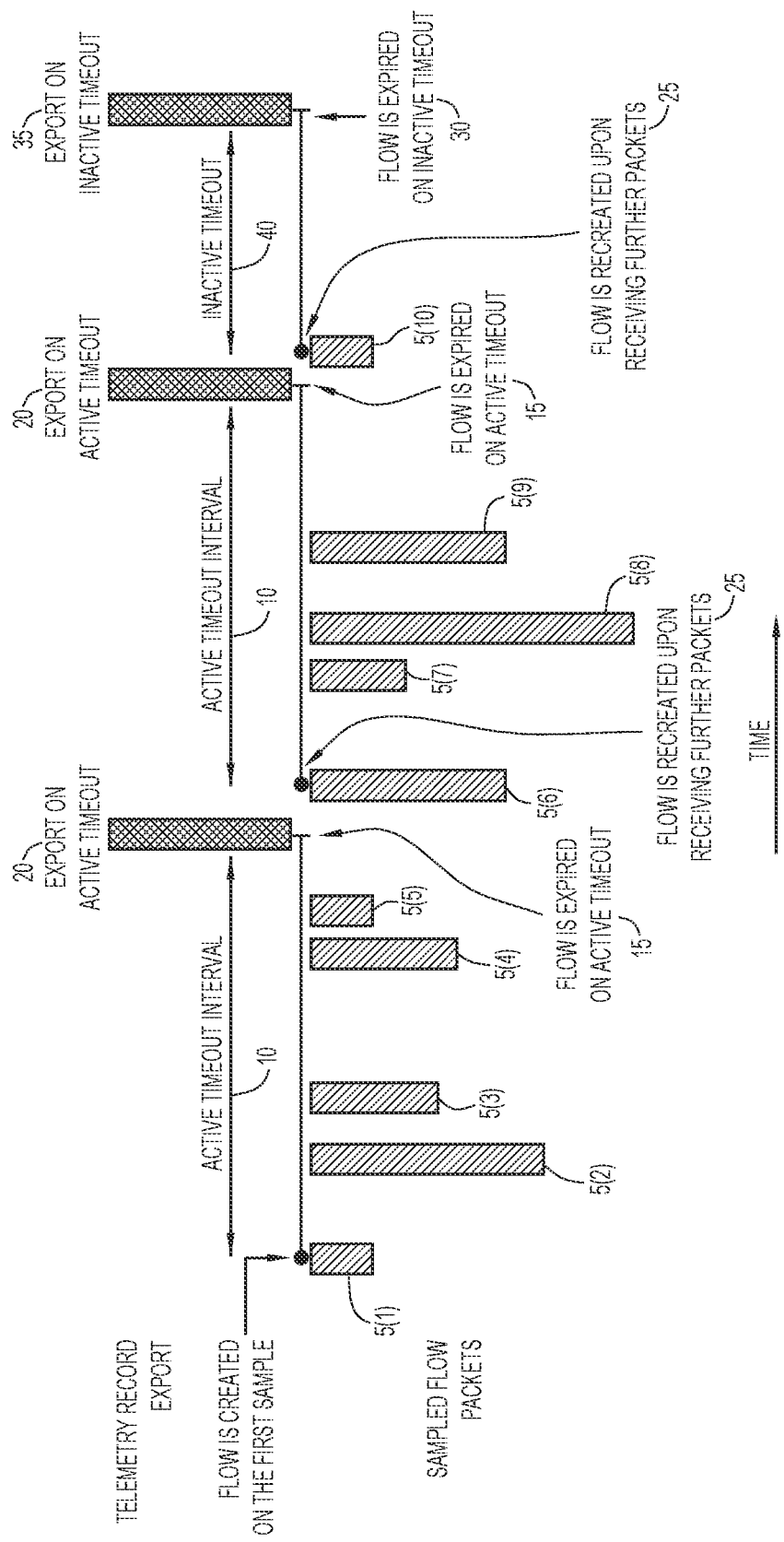
FIG. 1 is a diagram showing network telemetry record export operations using a monolithic telemetry template, according to existing techniques.

FIG. 1 below depicts current techniques for periodic export of complete data records that use a monolithic template. The telemetry records are exported periodically after active timeout, which typically is a large value (such as 1800 seconds by default), but can be set to as low as 30-60 seconds in some deployments.

In FIG. 1, sampled packets of a packet flow are shown at 5(1)-5(10), where time is progressing from left to right as shown in the figure. After a predetermined period of time during which packets are received and processed by a network device, called an active timeout interval, shown at 10, the network device exports a telemetry data record 20, using a monolithic telemetry template as shown at 15, and based on the accumulated sampled packets during active timeout interval 10. A flow may be recreated after receiving further packets, as shown at 25. In addition, after a packet flow expires, as shown at 30, the network device exports a telemetry data record 35 after an inactive timeout, as shown at 40.

FIG. 2 illustrates an example of a monolithic template 50 for IPv4 flows. The monolithic template 50 contains information elements (IEs) totaling 321 bytes in size. Thus, the data records exported periodically are each 321 bytes long excluding the flow record header bytes.

The monolithic template 50 shown in FIG. 2 includes many, if not most, information elements 52 that are 'static' in nature, in that they do not change throughout the life of the traffic (packet) flow. Examples of such static information elements 52 are source/destination Internet Protocol (IP) addresses, source/destination ports, interface indexes, flow direction, etc. The monolithic template 50 includes a header 51 that includes various system and configuration information, such as software version running on the network device, count, system uptime, system time (Unix seconds), flow sequence, and source identifier that identifies the network device that is the source of the telemetry data records for all flows exported from a particular network device.

Many of the information elements are self-explanatory by their names, such as IPV4SRCADDR, IPV4DSTADDR, etc. IN_BYTES is an incoming counter for a number of bytes associated with an IP flow. IN_PKTS is an incoming counter for the number of packets associated with an IP flow. INPUT_SNMP refers to a Simple Network Management Protocol (SNMP) input interface index and likewise OUT_SNMP refers to an SNMP output interface index. FIRST_SWITCHED refers to a system uptime at which the first packet of a flow was switched and LAST_SWITCHED refers to a system uptime at which the last packet of a flow was switched. SRC_AS is the source Border Gateway Protocol (BGP) autonomous system (AS) number and DST_AS is the destination BGP AS number. BGP_IPV4_NEXT_HOP is the next-hop router's IP address in the BGP domain. SRC_MASK is the length of the IPv4 source mask in contiguous bits and DST_MASK is the length of the IPv4 destination mask. PROT refers to the IP protocol type. TCP_FLAGS is a cumulative of all the TCP flags seen for a flow. TOS refers to a Type of Service byte setting when exiting an outgoing interface of the network device. DIRECTION is the flow direction, whereby, for example, 0 indicates an ingress flow and 1 indicates an egress flow. FORWARDING_STATUS indicates a forwarding status of a packet flow, such as unknown, forwarded, dropped, consumed, forwarded fragmented, drop Access Control List (ACL) deny, drop ACL drop, etc. There are numerous forwarding status codes that may be indicated by FORWARDING_STATUS. FLOW_SAMPLER_ID refers to the identifier in the "show flow-sampler" command. VRF_ID_INPUT refers to a virtual router forwarder (VRF) input identifier and VRF_ID_OUTUT refers to a VRF output identifier. AS_PATH identifies the BGP AS path for a flow. STD_COMM refers to standard BGP communities against with the destination IP address is routed.

Very few information elements are 'almost static' or relatively static in nature and may change rarely during the life of the flow. An example of an almost static information element is AS_PATH as shown at reference numeral 54.

Finally, very few information elements are 'dynamic' in nature and change very frequently during the life of the flow. Examples of dynamic IEs include IN-PKTS, IN_BYTES, as shown at 56 in FIG. 2.

As another example, set forth below in Table 1 below are information elements associated with a monolithic template for IPv6. It is noted that this template has a field called IPV6_FLOW_LABEL, but that is not to be confused with the field called FLOW_ID that is newly introduced in the split templates, as described below. The IEs in the table below are marked as S (Static), AS (Almost-Static) and D (Dynamic), and are similar to those shown in FIG. 2.

TABLE 1

| Monolithic Template for IPv6 | | |
|---|---|---|
| Information Element | Length | Type |
| IN_PKTS | 4 | D |
| IN_BYTES | 4 | D |
| IPV6_SRC_ADDR | 16 | S |
| IPV6_DST_ADDR | 16 | S |
| INPUT_SNMP | 4 | S |
| OUTPUT_SNMP | 4 | S |
| FIRST_SWITCHED | 4 | S |

TABLE 1-continued

| Monolithic Template for IPv6 | | |
|---|---|---|
| Information Element | Length | Type |
| LAST_SWITCHED | 4 | D |
| IPV6_FLOW_LABEL | 3 | S |
| IPV6_OPTION_HEADERS | 4 | S |
| SRC_PORT | 2 | S |
| DST_PORT | 2 | 5 |
| SRC_AS | 4 | S |
| DST_AS | 4 | S |
| BGP_IPV6_NEXT_HOP | 16 | AS |
| IPV6_DST_MASK | 1 | S |
| IPV6_SRC_MASK | 1 | S |
| PROT | 1 | S |
| TCP_FLAGS | 1 | S |
| SRC_TOS | 1 | S |
| DIRECTION | 1 | S |
| FORWARDING_STATUS | 1 | D |
| FLOW_SAMPLER_ID | 2 | S |
| VRF_ID_INPUT | 4 | S |
| VRF_ID_OUTPUT | 4 | S |
| AS_PATH | 128 | AS |
| STD_COMM | 128 | AS |

There is a substantial overhead to sending 'static' and 'almost static' information elements in every export, and this is what can cause rapid periodic export packets to be dropped.

To elaborate, a static information element is an element that does not change for the life of a traffic flow, such as Forwarding_Status, Input_VRF, IP_Protocol, Input_Interface or STD_COMM. Almost static information elements are elements that would likely remain the same, but could change during the life of the flow. Examples are BGP_path when there is convergence, or Output_Interface, in case or re-routing. Thus, almost static information elements are not likely to change but could change as part of a forwarding decision. Dynamic information elements are bound to change during the life of the traffic flow, such as Packet_Count and Last_Switched.

Rapid (Periodic) Export

The solution presented herein enables the sending of rapid (periodic or non-periodic) exports without causing drops in the export processing, by eliminating non-changing data from the flow record update. This significantly reduces the size of the export update, allowing more records to be included in a single telemetry update packet, since much of the telemetry data has not changed. This, in turn, reduces bandwidth overhead on the network, enabling packing of more records in a single update (by eliminating non-changed/redundant information) and provides for the ability to export at a higher rate, giving more direct and live network visibility. Further, a major savings can be achieved for static attributes are variable string sizes such as BGP communities and AS_PATH. These information elements do not change over the life time of the flow generally, and therefore present constant redundant static data.

The solution presented herein involves splitting the telemetry template into two templates:
 1. A first template for 'static' and 'almost static' information elements. The first template is called a 'Static IE Template'.
 2. A second template for 'dynamic' information elements. The second template is called a Dynamic IE Template.

Figure 3B:
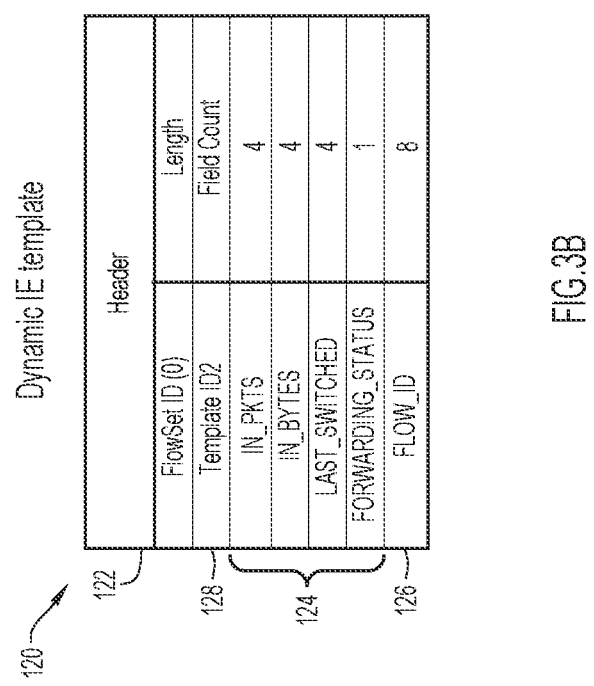

FIGS. 3A and 3B show the Static IE template 100 and Dynamic IE template 120, respectively, which are derived from the monolithic template 50 shown in FIG. 2. As an example, the Static IE template 100 will result in a telemetry data record that has a total of 316 bytes and the Dynamic IE template 120 will result in a telemetry data record that has a total of just 21 bytes.

FIG. 3A shows that the static IE template 100 includes a header 102, similar to header 51 of the monolithic template 50 shown in FIG. 2, static and almost static IEs 104 and a flow identifier (Flow_ID) field 106. The static and almost static IEs 104 correspond, for example, to the static and almost static IEs 52 and 54 of the monolithic template 50. In addition, the static IE template 100 includes a template ID field 108 that contains an identifier that is different from the template ID of the current monolithic template and also different from a template ID used by the dynamic IE template 120. For example, the template ID field 108 contains "Template ID1".

Similarly, FIG. 3B shows that the dynamic IE template 120 includes a header 122 (similar to header 51 of the monolithic template 50), dynamic IEs 124 and a flow identifier field 126. The dynamic IEs 124 correspond to the dynamic IEs 56 of the monolithic template 50, for example. The dynamic IE template 120 further includes a template ID field 128 that contains an identifier that is different from the template ID of the current monolithic template, and also different from the template ID of the static IE template 100. For example, the template ID field 128 contains "Template ID2".

When two (split) templates are used, a collector needs to correlate flow records belonging to the same traffic flow to construct a comprehensive view of the traffic flow. To this end, a new IE called 'FLOW_ID' is introduced and is included in static and dynamic flow records, as shown by flow identifier field 106 in the static IE template 100 and flow identifier field 126 in the dynamic IE template 120. A FLOW_ID is allocated every time a new traffic flow is created in flow cache on the network device and is inserted in all exported flow records corresponding to that traffic flow. This identifier could be a monotonically incrementing 64-bit number which can never wrap-around, as one example. A given traffic (packet) flow may be defined according to a plurality of networking parameters, such as a 5-tuple (source IP address, destination IP address, source port, destination port and protocol in use). Thus, the value in the flow identifier field 106 of a static IE flow record resulting from use of the static IE template 100 and the value in the flow identifier field 126 of a dynamic IE flow record resulting from use of the dynamic IE template 120 are the same for a given traffic flow. Moreover, since a static flow record and a dynamic flow record also uniquely identify the source (the network device that generated the record), then a flow record is uniquely identified by a particular traffic flow and identity of the network device that generated the flow record.

It should be understood that a network device may be configured to use multiple static and multiple dynamic templates associated with the same traffic flow, to produce multiple static flow records of different types and multiple dynamic flow records of different types.

Figure 4A:
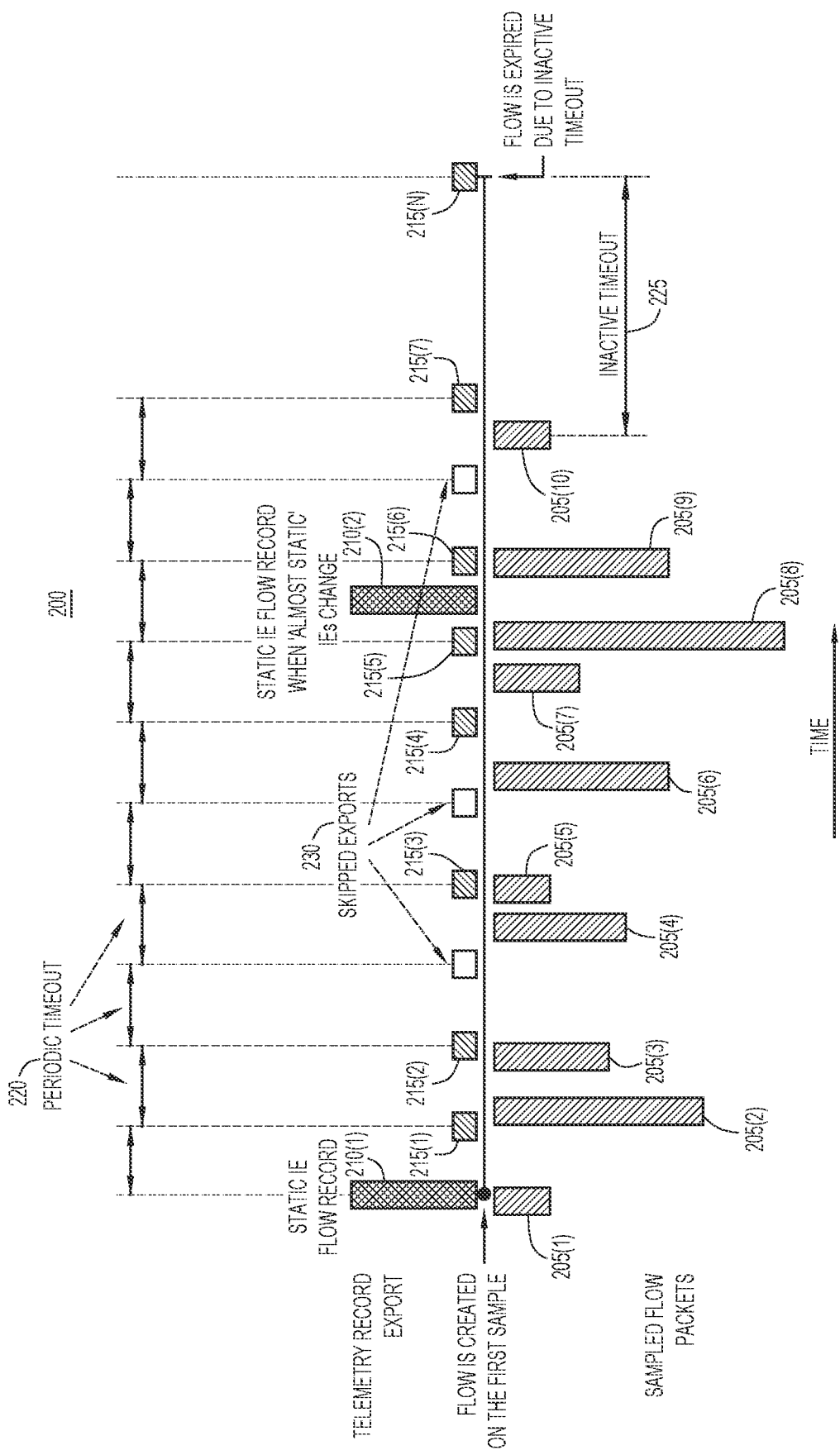

Turning now to FIGS. 4A and 4B, using two templates as depicted FIGS. 3A and 4B, a rapid export process 200 may be performed. In FIGS. 4A and 4B, sampled packets of a given traffic flow are shown at 205(1)-205(10). FIG. 4A illustrates a periodic timeout telemetry export and an inactive timeout telemetry export, whereas FIG. 4B illustrates an active timeout telemetry export.

As shown in FIG. 4A, a first static IE flow record 210(1) is sent at the beginning of the traffic flow, and a second static IE flow record 210(2) is sent again when at least one of the 'almost static' information elements changes for the traffic flow. Dynamic IE flow records 215(1)-215(N) may be sent more frequently (e.g., periodically) with a much smaller active timeout. As shown at 220, a periodic timeout occurs to export flow records, according to a periodic timer. This periodic timer may be, for example, 2 seconds, and is used to determine whether there is any flow record data to be exported on a rapid periodic basis. Inactive timeout occurs when there is no activity associated with a flow for a longer period of time, such as 15 seconds. The inactive timeout is shown at 225 in FIG. 4A, as an example. Since the dynamic IE flow records are very lightweight (such as 21 bytes for IPv4 flows, for example), they can be sent very frequently. Moreover, as the flow records are inherently batched, a telemetry export packet can contain a large number of the dynamic IE flow records 215(1)-215(N). For example, dynamic IE flow records 215(1), 215(2) and 215(3) can be consolidated into a single telemetry export packet; dynamic IE flow records 215(4), 215(5), 215(6), 215(7) and 215(N) can be consolidated into another (single) telemetry export packet. As shown at 230, many exports can be skipped at the end of the periodic export interval if there are no changes in the dynamic information of the flow, i.e., there are no changes in the values of the dynamic IEs.

FIG. 4B shows active timeout. As shown at 240, a flow expires after active timeout after sampled packet at 215(11), and a new flow is created when the next packet on the flow is received. An active timer may be, for example, 1800 seconds.

Figure 5:
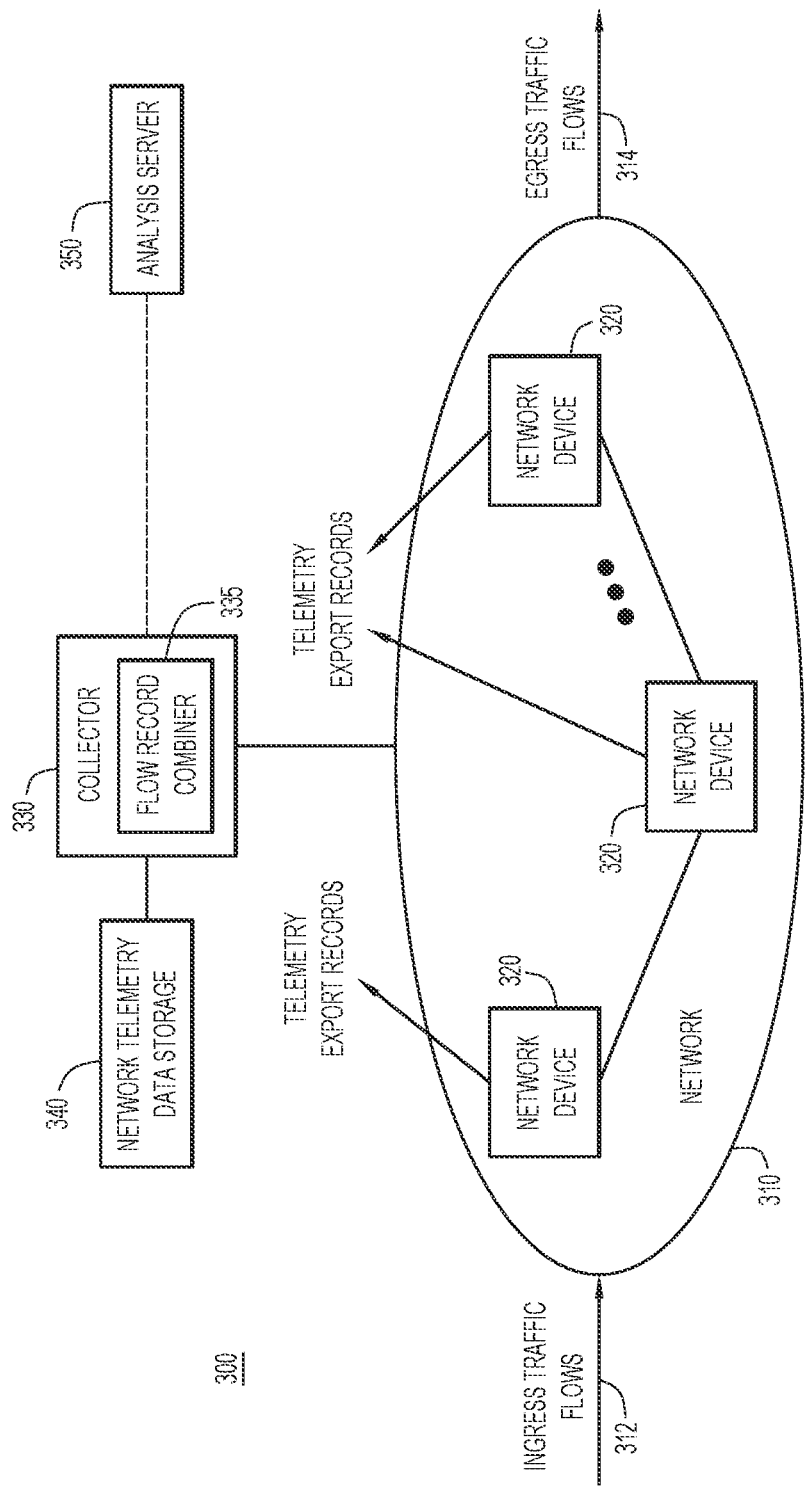
FIG. 5 illustrates a block diagram of a system in which one or more network devices are configured to use a static template and a dynamic template for telemetry record exporting, according to an example embodiment.

Reference is now made to FIG. 5. FIG. 5 shows a block diagram of a system 300 in which the techniques presented herein may be employed. The system 300 includes a network 310 to which ingress traffic may enter as shown at 312 and from which egress traffic may be sent, as shown at 314. The network 310 includes one or more network devices 320. The network device that sends the split flow records (static flow records and dynamic flow records) may send to the collector 330 template records to indicate to the collector 330 how the flow records, that follow, will be formatted. The network device subsequently exports the flow records that follow the format specified in the templates indicated to the collector 330. The template records may be exported at a configured interval, which may be relatively long (several minutes). In one form, the network device may indicate to the collector 330 by a template identifier which of the templates the network device is using for flow records that are to be sent by the network device.

The network devices 320 may include switches, routers, gateways, firewalls, etc. There may be multiple ingress and egress points to network 310. Traffic may enter a network device, or exit a network device, on which export of telemetry records is enabled. In other words, network traffic needs to pass through a particular network device for which telemetry export is enabled. It is to be understood that the network device may export template records to the collector 330 and then export the data records that follow the format specified in the templates. The template records are exported at a configured interval that typically is long (several minutes).

The system 300 further includes a collector 330, network telemetry data storage 340 and an analysis server 350. The network devices 320 export telemetry packets containing one or more static flow records and dynamic flow records to the collector 330. The collector 330 stores the static flow records and dynamic flow records, after correlating them to consolidate static flow records and dynamic flow records with the same flow identifier as being associated with the same traffic flow. The collector 330 may store the consolidated flow records in the network telemetry data storage 340. The collector 330 may include a flow record combiner 335 (implemented in software, for example) that combines flow records together based on flow identifier. The analysis server 350 may communicate with the collector 330 to retrieve flow records stored in the network telemetry data storage 340 in order to analyze the flow records for purposes of monitoring performance of one or more network devices in the network 310, isolating faults in the network, etc.

Figure 6:
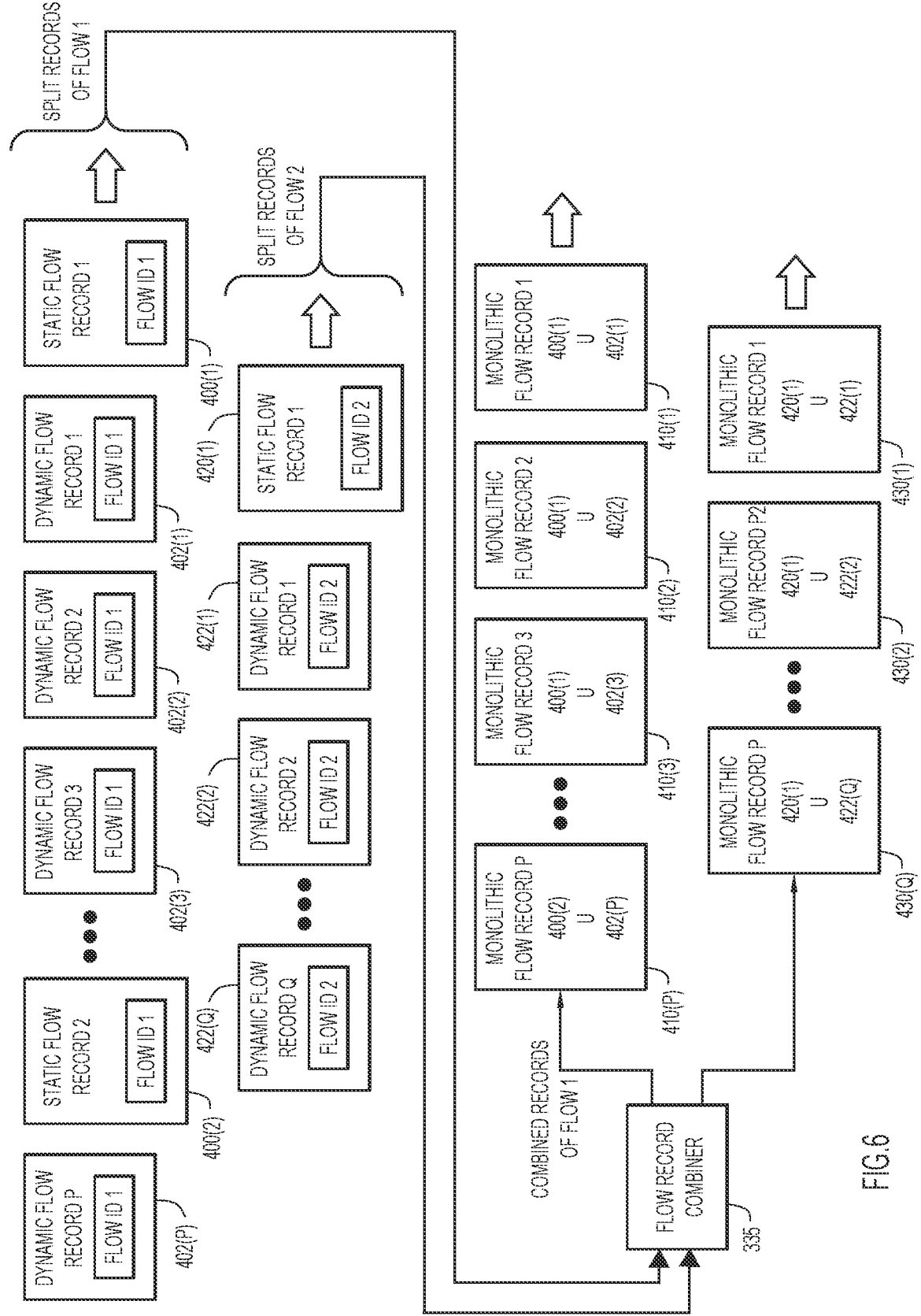
FIG. 6 illustrates how static flow records and dynamic flow records for a given traffic flow are matched and consolidated into flow data, according to an example embodiment.

Reference is now made to FIG. 6. FIG. 6 shows how the flow record combiner 335 of the collector 330 receives split IE records and combines them into monolithic records, by flow identifier. Reference is also made to FIG. 5 for purposes of the description of FIG. 6. The direction of flow of the flow records shown in FIG. 6 is from left to right. That is, the right-most record is the earliest transmitted record.

A monolithic record is a 'union' of a static record and a dynamic record. Based on received telemetry export packets from a given network device, the flow record combiner 335 of the flow record combiner 335 evaluates the flow identifier field in each of the static IE flow records and dynamic IE flow records as well as the source identifier of the flow records indicating with which network device the flow records are associated. The flow record combiner 335 matches flow records based on flow identifier (and source identifier, that is identifier of the network device that exported the telemetry packets) and creates a monolithic record as a union of the static and dynamic records for that flow identifier, e.g., '402(1) U 400(1)'. For example, FIG. 6 shows static IE flow records 400(1) and 400(2) and dynamic IE flow records 402(1)-402(P), all of which have flow identifier "1". The flow record combiner 335 caches the latest static IE flow record. For every dynamic IE flow record received after receiving the cached static IE flow record, the flow record combiner 335 creates a consolidated (monolithic) flow record which is a union of the IEs of the cached static IE flow record and the just received dynamic IE flow record. For example, when static IE flow record 400(1) is received, it is cached. When dynamic IE flow record 402(1) is received, the flow record combiner 335 creates a consolidated (monolithic) flow record 410(1) which is a union of the IEs from cached static IE flow record 400(1) and dynamic IE flow record 402(1). Following the same procedure, consolidated flow record 410(2) is created from static IE flow record 400(1) and dynamic IE flow record 402(2). Subsequently, the flow record combiner 335 creates consolidated flow record 410(3) is created from static IE flow record 400(1) and dynamic IE flow record 402(3). When flow record combiner 335 receives static IE flow record 400(2), it replaces the earlier cached static IE flow record 400(1) with static IE flow record 400(2) which is newly received. When dynamic IE flow record 402(P) is received, the flow record combiner 335 creates consolidated (monolithic) flow record 410(P) from newly cached static IE flow record 400(2) and dynamic IE flow record 402(P).

Similarly, FIG. 6 shows static IE flow record 420(1) and dynamic IE flow records 422(1)-422(Q), all of which have flow identifier "2". Following the same procedure described above, the flow record combiner 335 creates consolidated flow record 430(1) from static IE flow record 420(1) and dynamic IE flow record 422(1), creates consolidated flow record 430(2) from static IE flow record 420(1) and dynamic IE flow record 422(2), and creates consolidated flow record 430(Q) from static IE flow record 420(1) and dynamic IE flow record 422(Q).

Thus, FIG. 6 depicts a method for matching static flow records and dynamic flow records associated with a given traffic flow and creating consolidated (monolithic) flow records. This method involves caching a received static IE flow record for a given traffic flow, and then for each dynamic IE flow record for the given traffic flow received after that cached static IE flow record, generating a consolidated (monolithic) flow record based on a union operation of the IEs of the cached state IE flow record and the IEs of the dynamic IE flow record.

Figure 7:
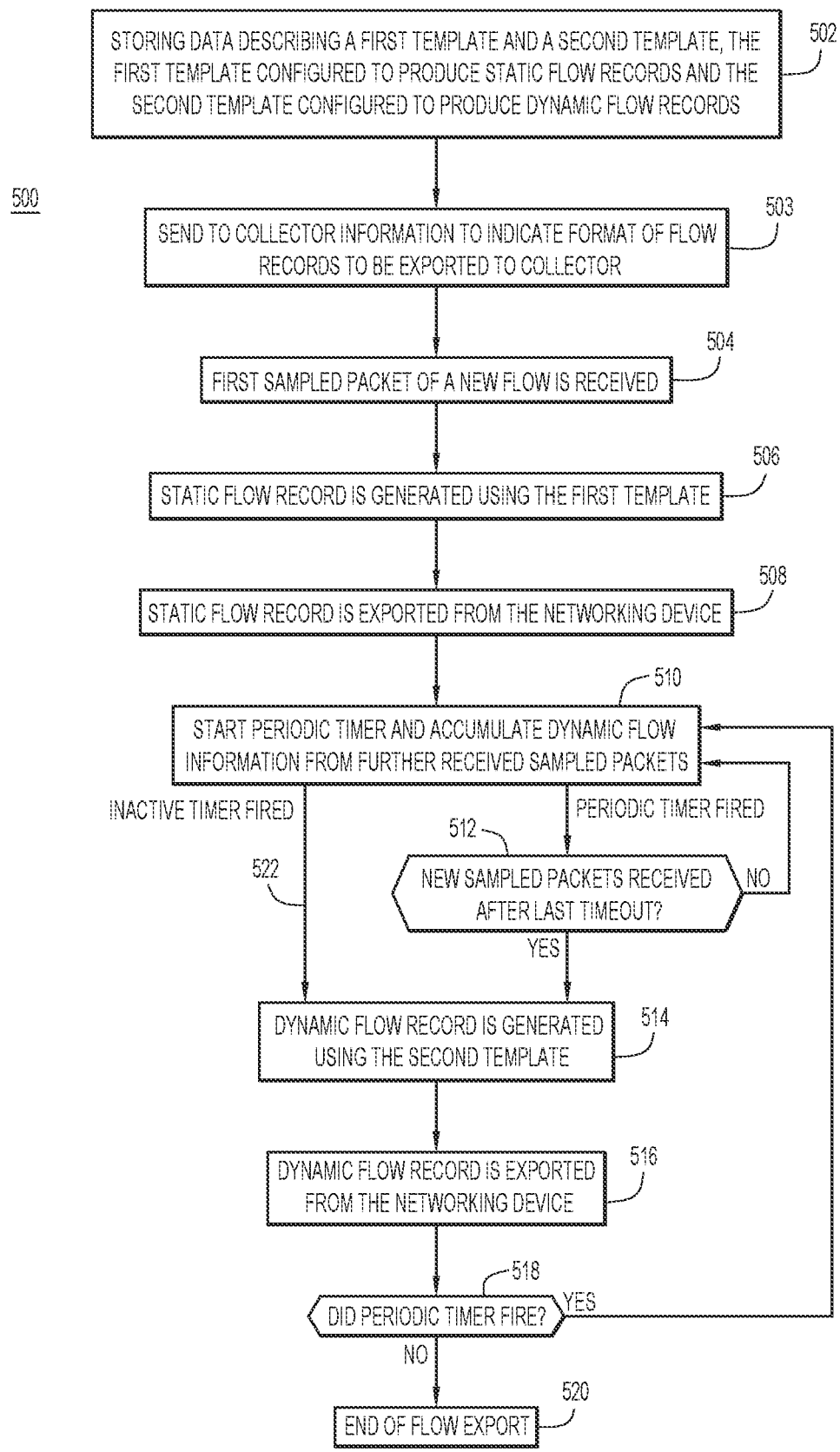
FIG. 7 illustrates a flow chart depicting network telemetry record generation operations performed by a network device, according to an example embodiment.

Reference is now made to FIG. 7, which shows a flow chart for a method 500 performed by a network device, according to the techniques presented herein. Reference is also made to FIGS. 4A and 4B for purposes of the description of FIG. 7. The method 500 is performed by a network device that receives and processes one or more traffic flows in a network. At 502, the method 500 includes storing data describing a first template and a second template, the first template configured to produce static flow records and the second template configured to produce dynamic flow records. The static flow records comprise information elements which are based on static characteristics of a given traffic flow processed by the network device. The dynamic flow records comprise information elements which are based on dynamic characteristics of the given traffic flow.

At 503, the network device sends to the collector information to indicate to the collector the format of the static and dynamic flow records that the network device will be exporting to the collector. The network device may send template records themselves, or identifiers of the templates. For example, the collector may store information about various flow record formats it may receive, in associated with a template identifier. The collector can then use a priori knowledge about various templates, and based on template identifiers sent from a network device, determine the format of the flow records the network device will be sending.

At 504, the network device obtains a first sampled packet of a new traffic flow received by the network device.

At 506, the network device generates a static flow record using the first (static) flow template.

The first template may be generated, a priori, based on information elements related to traffic flow characteristics that are 'static' or 'almost static', and the second template may be generated, a priori, based on information elements related to traffic flow characteristics that are 'dynamic'.

At 508, the network device exports the static flow record.

At 510, the network device starts the periodic timer and accumulates dynamic flow information from further received and sample packets.

At 512, the network device determines whether it has received new sampled packets after the last periodic timer timeout. If no new sampled packets have been received, then the method reverts back to operation 510.

If the network device determines, at 512, that new sampled packets have been received after the last periodic timer timeout, then at 514, the network device generates a dynamic flow record using the second (dynamic) template. At 516, the network device exports the dynamic flow record.

At 518, the network device determines whether the periodic timer fired. If the periodic timer fired, then the method reverts back to operation 510. If the periodic time did not fire, then as indicated at 520, the network device ends flow telemetry export.

Moreover, if the inactive timer fires, then, as indicated at 522, the method goes from operation 510 to operation 514.

The first template may be generated, a priori, based on information elements related to traffic flow characteristics that are 'static' or 'almost static', and the second template may be generated, a priori, based on information elements related to traffic flow characteristics that are 'dynamic'.

As described above in connection with FIGS. 4A and 4B, the dynamic flow records are generated more frequently than the static flow records, and when one or more information elements of the second template changes. Moreover, the static flow records are generally substantially larger in size than the dynamic flow records. In one example, the static flow records and the dynamic flow records are formatted according to one of: a NetFlow record and/or an Internet Protocol Flow Information Export (IPFIX) record.

The static flow records and the dynamic flow records each contain a flow identifier field that is populated with an identifier that is the same for the given traffic flow to allow for correlation of the static flow records and the dynamic flow records associated with the given traffic flow. In this regard, the method 500 may further include allocating a new flow identifier for each traffic flow that the network device receives and processes.

A first static flow record may be generated for the given traffic flow upon the network device receiving traffic for the given traffic flow and a second static flow record may be generated for the given flow only after changes occur for one or more static characteristics of the given traffic flow.

As described above in connection with FIGS. 4A and 4B, the exporting operation 530 may involve including within a single telemetry export packet, a plurality of dynamic flow records accumulated over time.

Figure 8:
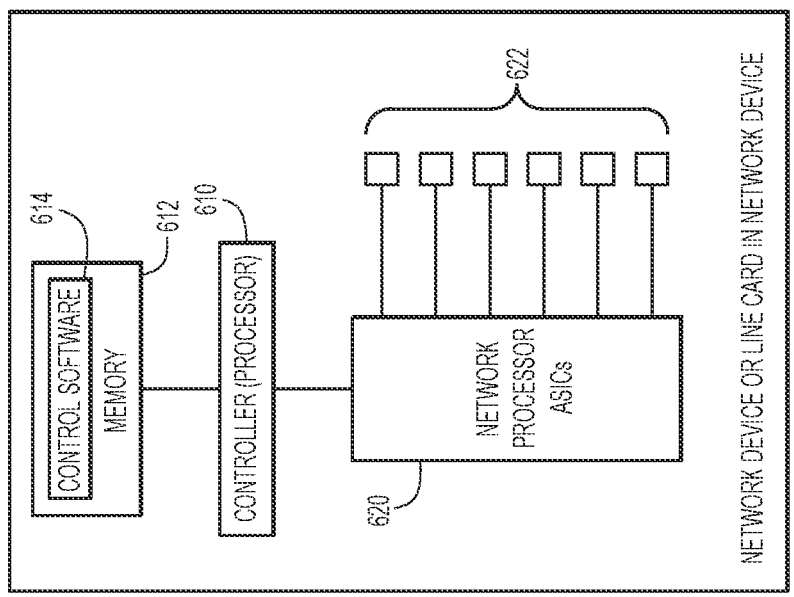
FIG. 8 is a block diagram of a network device configured to perform the network telemetry record generation operations, according to an example embodiment.

Reference is now made to FIG. 8. FIG. 8 illustrates a simplified block diagram of a network device 600 (or a line card within a network device) configured to perform the operations described in connection with FIGS. 3A, 3B, 4A, 4B and 5-7, according to an example embodiment. The network device 600 includes a controller 610 (e.g., a microprocessor microcontroller), memory 612 that stores instructions for control software 614 that is executed by the controller 610, network processor application specific integrated circuits (ASIC(s)) 620, and a plurality of network ports 622. The controller 610 performs overall control of the network device 600, while the network processor ASIC(s) 620 may be configured to perform various network processing operations, such as switching, routing, etc., with respect to network traffic receive at one of the network ports 622 and for network traffic to be sent via one of the network ports 622.

The control software 614 may include software instructions that cause the controller 610 to perform the operations described herein. Alternatively, digital logic of the network processor ASIC(s) 620 may be configured to cause the network processor ASIC(s) 620 to perform the operations described herein.

The network device 600 may have wireless network connectivity (e.g., wireless local area network connectivity). For simplicity, the components suitable to support wireless network connectivity are not shown in FIG. 8.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The advantages of this solution is manifold. The amount of data sent in the network is drastically reduced (21 bytes per rapid export interval, versus 321 bytes per interval of period export in the existing methods). Very small Dynamic IE flow records allow batching of a large number of flows in a single export packet. Real-time traffic updates to an analytics engine on the collector side results into faster network reconfiguration decisions and other relevant actions.

In summary, the techniques presented herein facilitate rapid/periodic exports of network traffic flow telemetry exports possible by splitting a conventional monolithic template into a static IE template and a dynamic IE template. Static IE flow records are sent only at the beginning of a flow, or when 'almost static' IEs change. Dynamic IE records are sent very frequently, but only when there is a dynamic IE change.

This solution involves several unique aspects, including: classifying information elements in a conventional monolithic template as 'static', 'almost static, and 'dynamic' information elements; splitting a conventional monolithic template into a static IE template and a dynamic IE template where the static IE template comprises 'static' and 'almost static' information elements and the dynamic IE template comprises 'dynamic' information elements; exporting a static IE flow record at the beginning of a traffic flow and when at least one of the almost static information elements changes; rapidly/periodically exporting a dynamic IE flow record at a very frequent interval, but only when at least one of the dynamic information elements changes; a new information flow identifier element that is inserted in all static IE flow records and dynamic IE flow records for the correlation of these records; and exporting Static IE flow records and dynamic IE flow records, per an export interval.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a network device that receives and processes one or more traffic flows in a network, storing data describing a first template and a second template, the first template configured to produce static flow records comprising information elements which are based on static or relatively static characteristics of a given traffic flow processed by the network device and the second template configured to produce dynamic flow records comprising information elements which are based on dynamic characteristics of the given traffic flow;
generating the static flow records using the first template and the dynamic flow records using the second template for the given traffic flow processed by the network device, wherein the dynamic flow records are generated more frequently than the static flow records; and
exporting the static flow records and the dynamic flow records from the network device.

2. The method of claim 1, wherein the dynamic flow records are generated when there is a change to one or more information elements of the second template.

3. The method of claim 1, wherein the static flow records are substantially larger in size than the dynamic flow records.

4. The method of claim 1, wherein the static flow records and the dynamic flow records each contain a flow identifier field that is populated with an identifier that is the same for the given traffic flow to allow for correlation of the static flow records and the dynamic flow records associated with the given traffic flow.

5. The method of claim 4, further comprising:
allocating a new flow identifier for each traffic flow that the network device receives and processes.

6. The method of claim 1, wherein generating includes generating a first static flow record for the given traffic flow upon the network device receiving traffic for the given traffic flow and exporting a second static flow record for the given traffic flow only after changes occur for one or more static or relatively static characteristics of the given traffic flow.

7. The method of claim 1, further comprising, prior to the exporting, sending to a collector, information indicating format of the first template and second template for the static flow records and dynamic flow records, respectively.

8. The method of claim 1, wherein the static flow records and the dynamic flow records are formatted according to one of: a NetFlow record and/or an Internet Protocol Flow Information Export (IPFIX) record.

9. The method of claim 1, wherein exporting includes exporting within a single telemetry export packet, a plurality of dynamic flow records accumulated over time.

10. An apparatus comprising:
a plurality of network ports configured to receive incoming network traffic and to send outgoing network traffic;
a network processor coupled to the plurality of network ports, the network processor configured to process the incoming network traffic and to control sending of the outgoing network traffic;
a memory;
a controller coupled to the network processor and to the memory, wherein the controller is configured to:
store in the memory, data describing a first template and a second template, the first template configured to produce static flow records comprising information elements which are based on static or relatively static characteristics of a given traffic flow and the second template configured to produce dynamic flow records comprising information elements which are based on dynamic characteristics of the given traffic flow;
generate the static flow records using the first template and the dynamic flow records using the second template for the given traffic flow processed by the apparatus, wherein the controller is configured to generate the dynamic flow records more frequently than the static flow records; and
cause export of the static flow records and the dynamic flow records from the apparatus.

11. The apparatus of claim 10, wherein the controller is configured to generate the dynamic flow records when there is a change to one or more information elements of the second template.

12. The apparatus of claim 10, wherein the static flow records are substantially larger in size than the dynamic flow records.

13. The apparatus of claim 10, wherein the static flow records and the dynamic flow records each contain a flow identifier field that is populated with an identifier that is the same for the given traffic flow to allow for correlation of the static flow records and the dynamic flow records associated with the given traffic flow.

14. The apparatus of claim 13, wherein the controller is configured to allocate a new flow identifier for each traffic flow that the apparatus receives and processes.

15. The apparatus of claim 10, wherein the controller is configured to generate a first static flow record for the given traffic flow upon the apparatus receiving traffic for the given traffic flow and exporting a second static flow record for the given traffic flow only after changes occur for one or more static characteristics of the given traffic flow.

16. The apparatus of claim 10, wherein the controller is configured to cause export of a single telemetry export that includes a plurality of dynamic flow records accumulated over time.

17. One or more non-transitory computer readable storage media encoded with software comprising computer executable instructions and when the software is executed by a processor of a network device, it is operable to cause the processor to perform operations including:
storing data describing a first template and a second template, the first template configured to produce static flow records comprising information elements which are based on static or relatively static characteristics of a given traffic flow processed by the network device and the second template configured to produce dynamic flow records comprising information elements which are based on dynamic characteristics of the given traffic flow;
generating the static flow records using the first template and the dynamic flow records using the second template for the given traffic flow processed by the network device, wherein the dynamic flow records are generated more frequently than the static flow records; and
exporting the static flow records and the dynamic flow records from the network device.

18. The non-transitory computer readable storage media of claim 17, wherein the dynamic flow records are generated when one or more information elements of the second template changes.

19. The non-transitory computer readable storage media of claim 17, wherein the static flow records and the dynamic flow records each contain a flow identifier field that is populated with an identifier that is the same for the given traffic flow to allow for correlation of the static flow records and the dynamic flow records associated with the given traffic flow.

20. The non-transitory computer readable storage media of claim 17, wherein the instructions operable for performing the exporting include instructions operable for exporting within a single telemetry export packet, a plurality of dynamic flow records accumulated over time.

* * * * *